3,410,756
NAPHTHYL ESTERS AS FLUOROGENIC
SUBSTRATES FOR ENZYMES
George G. Guilbault, Edgewood, and David N. Kramer,
Stevenson, Md., assignors to the United States of America as represented by the Secretary of the Army
No Drawing. Filed May 27, 1966, Ser. No. 554,645
5 Claims. (Cl. 195—103.5)

This invention relates to a process for the detection of small concentrations of enzymes. It is applicable to the detection of cholinesterase acylase and phosphatase.

A great many methods have been described in the prior art for the determination of cholinesterase based on enzymatic hydrolysis. A majority of these methods involve either the measurement of the rate of acid production by pH change or by the manometric determination of carbon dioxide liberation or utilize colorimetric or electrochemical techniques.

The prior art teaches that the previous colorimetric, manometric and electrochemical procedures for horse serum cholinesterase are limited to large quantities of substrate concentrations because of limitations in molar absorptivities or measurement of gas volumes or change in potential.

Various esters have been employed in this field of chemistry, for instance resorufin and indoxyl esters wherein these compounds were proven to be useless by being unstable in a continuous system for the analysis of anticholinesterase compounds.

One of the objects of our invention is to develop a fluorometric method for measurement of extremely small concentrations of enzymes.

An object of our invention is to prepare a series of esters of various fluorescent materials, themselves nonfluorescent, which upon hydrolysis by enzymes will produce easily measured products.

Another object of our invention is to develop a rapid and sensitive fluorometric estimation of enzyme concentration.

Another object of our invention is to employ fluorogenic esters whereby these compounds are stable for use in a continuous system.

By the method of our invention it has been found possible to measure enzyme activity at very low substrate concentrations ($10^{-2}$ M to $5 \times 10^{-7}$ M) by hydrolyzing a non-fluorescent ester in the presence of a buffer having a pH of 7.40 with an enzyme to produce a highly fluorescent material, registering the rate of change in fluorescence with time, $\Delta F$-$\Delta t$; determining the slope of the curve $\Delta F/\Delta t$; recording the calibration plots of $\Delta F/\Delta t$ versus enzyme concentration whereby the unknown concentration of enzyme may be determined.

Other and further objects and advantages will be understood by those skilled in the art or will be apparent or pointed out in this disclosure.

The following reagents were employed in the reaction:
(A) The hydrolyzing agents (enzymes)
  (1) Cholinesterase, horse serum (Armour Industrial Chemical Company), specific activity 1.90 units—one unit represents one micromole of acetycholine hydrolyzed per milligram of enzyme per minute. Solutions were prepared by dissolving the material in 0.1 M tris buffer, pH 7.40.
  (2) Acylase (Armour Research Co.), activity 1.0 unit per mg.
  (3) Acid phosphatase, potato (Nutritional Biochem Co.), activity 100 units per mg.
(B) Buffer
  (1) MacIlvaine buffer
    (a) A constant 0.10 ionic strength MacIlvaine buffer, pH 7.40, was prepared by dissolving the appropriate amounts of disodium hydrogen phthalate, citric acid and potassium chloride in triply distilled water.
  (2) Tris buffer
    (a) Tris (hydroxymethyl) aminomethane, pH 7.40 and 8.0, 0.01 and 0.1 M, was prepared by dissolving the appropriate amount of Sigma 7–9 buffer (Sigma Chemical Co.) in distilled water, HCl, 0.1 M, was added to adjust the pH.
(C) Substrates
  (1) α-naphthyl acetate; α-naphthyl n-butyrate
  (2) β-naphthyl acetate; β-naphthyl n-butyrate
  (3) β-naphthyl phosphate An Aminco-Bowman spectrophotofluorometer (SPF) equipped with a xenon lamp, an optical unit for proper control of the fluorescence excitation and emission wave lengths, a Beckman linear recorder, and a thermoelectric cooler to maintain constant temperatures was used in all measurements.

According to our invention, the non-fluorescent alpha and beta naphthyl esters and beta naphthyl phosphate when hydrolyzed by the enzymes cholinesterase, acylase or acid phosphatase are converted to the highly fluorescent compounds, alpha and beta naphthol. By following the rate of change in fluorescence with time, $\Delta F/\Delta t$, horse serum cholinesterase, in concentrations of substantially 0.0001 to 0.500 unit per ml., was determined with a standard deviation of ±1% employing the substrate, beta naphthyl acetate, at an optimum concentration of $3.4 \times 10^{-4}$ M in MacIlvaine buffer, pH 7.40. In addition, concentrations of substantially 0.0010 to 3.0 units per ml. of acylase was determined with a deviation of ±1.2% and concentrations of substantially 0.0005 to 0.100 unit per ml. of acid phosphatase was determined by measuring the rate of production of beta naphthol from beta naphthyl phosphate (Table I).

It was found that the optimum fluorescence and rate of hydrolysis of beta naphthyl acetate, $\Delta F$/min., was obtained using $3.4 \times 10^{-4}$ M substrate in MacIlvaine buffer, pH 7.40.

TABLE I.—DETERMINATION OF VARIOUS ENZYMES

| Cholinesterase, Units/Ml | | Acylase, Units/Ml | | Acid Phosphatase, Units/Ml | | Rel. Error, Percent | | |
|---|---|---|---|---|---|---|---|---|
| Present | Found | Present | Found | Present | Found | ChE | Acylase | A.P. |
| 0.000308 | 0.000310 | 0.00100 | 0.00101 | 0.000500 | 0.000508 | +0.6 | +1.0 | +1.6 |
| 0.000617 | 0.000617 | 0.00500 | 0.00508 | 0.00100 | 0.00101 | 0.0 | +1.6 | +1.0 |
| 0.00123 | 0.00121 | 0.0100 | 0.0100 | 0.00500 | 0.00498 | −1.6 | 0.0 | −0.4 |
| 0.00617 | 0.00614 | 0.0500 | 0.0498 | 0.0100 | 0.00995 | −0.5 | −0.4 | −0.5 |
| 0.0617 | 0.0619 | 0.100 | 0.0995 | 0.0250 | 0.0250 | +0.3 | −0.5 | 0.0 |
| 0.123 | 0.121 | 1.00 | 1.015 | 0.0500 | 0.0508 | −1.6 | +1.5 | +1.6 |
| | | | | Standard Deviation | | ±1.0% | ±1.2% | ±1.2% |

The variation of these parameters as a function of pH and type of buffer is given in Table II.

TABLE II.—EFFECT OF pH ON THE HYDROLYSIS OF BETA NAPHTHYL ACETATE. BETA NAPHTHYL ACETATE= $3.4 \times 10^{-4}$ M; ChE=0.0625 UNITS/Ml

| pH | ΔF/min. | Fluorescence (max.) Units |
|---|---|---|
| 6.0 Phosphate | 0.60 | 4.7 |
| 6.76 MacIlvaine | 1.42 | 7.0 |
| 7.00 MacIlvaine | 1.50 | 8.0 |
| 7.40 MacIlvaine | 1.80 | 10.0 |
| 7.40 Tris | 0.62 | 4.6 |
| 7.90 MacIlvaine | 1.80 | 10.0 |
| 8.00 Tris | 0.70 | 6.0 |

A series of esters of alpha and beta naphthol (I and III) were tested as substrates for cholinesterase. The substrate beta naphthyl phosphate was also employed.

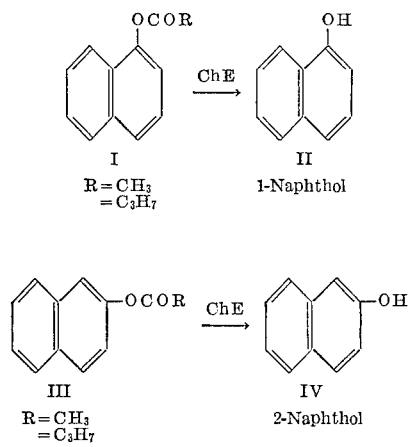

I
R = CH$_3$
  = C$_3$H$_7$

II
1-Naphthol

III
R = CH$_3$
  = C$_3$H$_7$

IV
2-Naphthol

These compounds (I and III) themselves non-fluorescent, are hydrolized by cholinesterase to the highly fluorescent compounds, alpha and beta naphthol (II and IV). Alpha naphthol has maximum excitation and emission wavelengths at 310 and 450–460 m$\mu$; beta naphthol, 320 and 410 m$\mu$. The fluorescence coefficients (fluorescence units/concentration in moles/liter) are $1.0 \times 10^4$ and $1.2 \times 10^5$, respectively. These values were obtained by recording the fluorescence of various concentrations of alpha and beta naphthol, prepared by completely hydrolizing the purified acetates with cholinesterase. The absolute value of the fluorescence coefficients can be related from instrument to instrument by comparison to the fluorescence coefficient of a standard, quinine sulfate in 0.1 M sulfuric acid, which has excitation and emission wavelengths approximately the same as the naphthols, 350 and 450 m$\mu$, respectively. The compound, beta naphthyl phosphate, a non-fluorescent reactant was hydrolyzed to the highly fluorescent compound, beta naphthol (IV).

The rates of hydrolysis of the naphthol esters catalyzed by the enzymes are given in Table III.

From the aspects of stability and enzyme activity, beta naphthyl acetate appears to be the preferred substrate for horse serum cholinesterase. The Michaels constants ($K_m$) for the naphthyl esters are given in Table IV, with the value for indoxyl acetate given for comparison.

TABLE IV.—MICHAELIS CONSTANTS FOR VARIOUS FLUOROGENIC SUBSTRATES

| Substrate | Enzyme | $K_m$ |
|---|---|---|
| Alpha Naphthyl Acetate | Horse Serum Ch E | $1.5 \times 10^{-4}$ |
| Alpha Naphthyl Butyrate | do | $3.0 \times 10^{-4}$ |
| Beta Naphthyl Acetate | do | $1.8 \times 10^{-4}$ |
| Beta Naphthyl Butyrate | do | $2.6 \times 10^{-4}$ |
| Beta Naphthyl Phosphate | Acid Phosphatase | $1.7 \times 10^{-4}$ |
| Indoxyl Acetate | Horse Serum Ch E | $3.4 \times 10^{-4}$ |

The fluorogenic substrates investigated were found to be hydrolized rapidly to highly fluorescent products by the enzymes cholinesterase, acylase, and acid phosphatase. With one of these substrates, beta naphthyl acetate, 0.00030 to 0.10 unit/ml. of cholinesterase and 0.0010 to 1.000 unit/ml. of acylase, may be determined with standard deviations of ±1.0 and ±1.2%, respectively. Using beta naphthyl phosphate, acid phosphatase in concentrations of 0.00050 to 0.100 unit/ml. may be determined with a deviation of ±1.2%.

Example I.—Determination of cholinesterase 0.10 ml. of $10^{-2}$ M beta naphthyl acetate was added to 2.80 ml. of MacIlvaine buffer, pH 7.40, the Aminco-Bowman (SPF) was set to wavelengths of 320 and 410 m$\mu$, and the instrument was adjusted to read zero. At zero time, 0.1 ml. of a solution of the enzyme containing 0.00090 to 0.50 unit of cholinesterase was added and the change in fluorescence of the solution, due to production of beta naphthol was recorded vs. time, usually for a period of two minutes:

The slope of this curve, $\Delta F/\Delta t$, was then recorded, and from calibration plots of $\Delta F/\Delta t$ vs. enzyme concentration, the activity of enzyme can be calculated.

Example II.—Determination of acylase

Add 2.80 ml. of MacIlvaine buffer, pH 7.40 to 0.10 ml. of $10^{-2}$ M beta naphthyl acetate, set the Aminco-Bowman Spectrophotofluorometer (SPF) to wavelengths of 320 and 410 m$\mu$, and adjust the instrument to read zero. At zero time, 0.1 ml. of a solution of the enzyme to be assayed, containing 0.0030 to 3.0 units of acylase was added and the change in the fluorescence of the solution due to production of beta naphthol was then recorded vs. time, usually for a period of two minutes:

The slope of this curve, $\Delta F/\Delta t$, was recorded and from calibration plots of $\Delta F/\Delta t$ vs. enzyme concentration, the activity of enzyme can be calculated.

Example III.—Determination of acid phosphatase

Add 2.80 ml. of MacIlvaine buffer, pH 7.40 to 0.10 ml. of $10^{-2}$ M beta naphthyl acid phosphate, set the Aminco-Bowman Spectrophotofluorometer (SPF) to wavelengths of 320 and 410 m$\mu$, and adjust the instrument to read zero. At zero time, 0.1 ml. of a solution of the enzyme to be assayed, containing units of acid phosphatase was added and the change in fluorescence of the solution due to production of beta naphthol was then recorded vs. time, usually for a period of two minutes.

The slope of this curve, $\Delta F/\Delta t$, was recorded and from

TABLE III.—HYDROLYSIS OF NAPHTHYL ESTERS BY VARIOUS ENZYMES (ESTER CONCENTRATION)=$3.4 \times 10^{-4}$M IN MACILVAINE BUFFER, pH 7.40

| Enzyme | ΔF/minute, Fluorescence Units/min. | | | |
|---|---|---|---|---|
|  | Alpha Ac | Alpha n-Bu | Beta Ac | Beta n-Bu |
| Horse Serum Cholinesterase | 0.95 | 1.18 | 1.53 | 1.15 |
| Acylase | 0.30 | 0.48 | 1.15 | 1.40 |
| Phosphatase | 0.15 | 0 | 1.03 | 0 |
| Spontaneous (No Enzyme) | 0.02 | 0.08 | 0.02 | 0.025 | calibration plots of $\Delta F/\Delta t$ vs. enzyme concentration, the activity of enzyme can be calculated.

As set forth in the above disclosure, the process of this invention may be employed in the following manner.

(1) Assay of enzymatic preparations in production and quality control.

(2) Assay of anticholinesteratic pesticides, for example; Systox (O,O-diethyl 2-ethyl thioethyl phosphorothioate).

(3) Detection of cholinesterase in blood diagnostic tests.

We claim:

1. A process of measuring enzyme activity at a low range of substrate concentrations which consists of the steps of:
   (a) hydrolyzing in the presence of MacIlvaine buffer, pH 7.40, a fluorogenic substrate taken from the group consisting of acetyl and butyryl esters of $\alpha$ and $\beta$-naphthol and $\beta$-naphthyl phosphate with an enzyme taken from the group consisting of cholinesterase, acylase, and acid phosphatase to produce highly fluorescent materials;
   (b) registering the rate of change in fluorescence with time, $\Delta F/\Delta t$;
   (c) determining the slope of the curve $\Delta F/\Delta t$;
   (d) recording the calibration plots of $\Delta F/\Delta t$ versus enzyme concentration whereby the unknown concentration of enzyme may be determined.

2. A process of measuring enzyme activity as defined in claim 1 wherein the range of substrate concentrations varies from $10^{-2}$ M to $5 \times 10^{-7}$ M.

3. A process of measuring enzyme activity as defined in claim 1 wherein a member of the group consisting of $\alpha$-naphthyl butyrate, $\beta$-naphthyl butyrate, $\alpha$-naphthyl acetate and $\beta$-naphthyl acetate in the presence of cholinesterase are converted to the corresponding $\alpha$-naphthol and $\beta$-naphthol respectively.

4. A process as defined in claim 1 wherein a member of the group consisting of $\alpha$-naphthyl acetate, $\alpha$-naphthyl butyrate, $\beta$-naphthyl acetate and $\beta$-naphthyl butyrate, in the presence of acylase are converted to the corresponding $\alpha$-naphthol and $\beta$-naphthol respectively.

5. A process as defined in claim 1 wherein $\beta$-naphthyl phosphate, in the presence of acid phosphatase is converted to $\beta$-naphthol.

References Cited

UNITED STATES PATENTS 3,049,411  8/1962  Gelman et al. _____ 195—103.5

ALVIN E. TANENHOLTZ, *Primary Examiner.*